(12) United States Patent
Hester et al.

(10) Patent No.: US 9,927,065 B2
(45) Date of Patent: Mar. 27, 2018

(54) LEAK CATCHING DEVICE

(71) Applicants: Clifford David Hester, Saratoga Springs, UT (US); Justin Johanson, Queen Creek, AZ (US)

(72) Inventors: Clifford David Hester, Saratoga Springs, UT (US); Justin Johanson, Queen Creek, AZ (US)

( * ) Notice: Subject to any disclaimer, the term of this patent is extended or adjusted under 35 U.S.C. 154(b) by 0 days.

(21) Appl. No.: 15/194,255

(22) Filed: Jun. 27, 2016

(65) Prior Publication Data

US 2017/0370525 A1 Dec. 28, 2017

(51) Int. Cl.
*F16N 31/02* (2006.01)

(52) U.S. Cl.
CPC .................. *F16N 31/02* (2013.01)

(58) Field of Classification Search
CPC .......... B65D 81/261; B65D 7/00; B65D 7/42; B65D 11/20; Y10T 137/5762; F16N 31/002; F16N 31/004; F16N 31/006; F16N 31/02
USPC .... 220/571, 571.1, 573, 607, 608, 604, 623, 220/610; 184/106; 180/69.1
See application file for complete search history.

(56) References Cited

U.S. PATENT DOCUMENTS

| | | | | |
|---|---|---|---|---|
| 1,811,074 A * | 6/1931 | Butler | ...................... | B65D 5/008 229/104 |
| 2,732,024 A * | 1/1956 | Schonwald | ............ | F01M 11/04 180/69.1 |
| 3,352,450 A * | 11/1967 | Rawlins | .................. | B44D 3/128 220/483 |
| 3,669,204 A * | 6/1972 | Andrews | ............... | F16N 31/006 180/69.1 |
| 4,084,655 A * | 4/1978 | Savron | .................. | F16N 31/006 180/69.1 |
| 4,098,398 A * | 7/1978 | Meyers | ..................... | B65D 5/46 141/340 |
| 5,526,900 A * | 6/1996 | Mason | .................. | F16N 31/006 141/86 |
| 5,921,602 A * | 7/1999 | Holbus | ................. | F16N 31/006 296/38 |
| 6,378,639 B1 * | 4/2002 | Murray | .................. | F16N 31/006 180/69.1 |
| 6,945,362 B1 * | 9/2005 | Sumpter, Sr. | ......... | F16N 31/002 184/106 |
| 2011/0042383 A1 * | 2/2011 | Boroughf | .............. | F16N 31/002 220/560.03 |

* cited by examiner

*Primary Examiner* — Robert J Hicks

(74) *Attorney, Agent, or Firm* — Griffiths & Seaton PLLC

(57) ABSTRACT

A leak catching apparatus is provided. The leak catching apparatus may include a plate having a first section, a center section, and a second section, wherein the first section is non-coplanar with the second section; an absorbent material housed on the first section; one or more absorbent material attachments coupled to the first section to secure the absorbent material to the first section; and one or more plate attachments coupled to the first section and the second section, wherein the one or more plate attachments temporarily secures the first section and the second section to a sealed system that contains liquid.

20 Claims, 8 Drawing Sheets

FIG. 1B

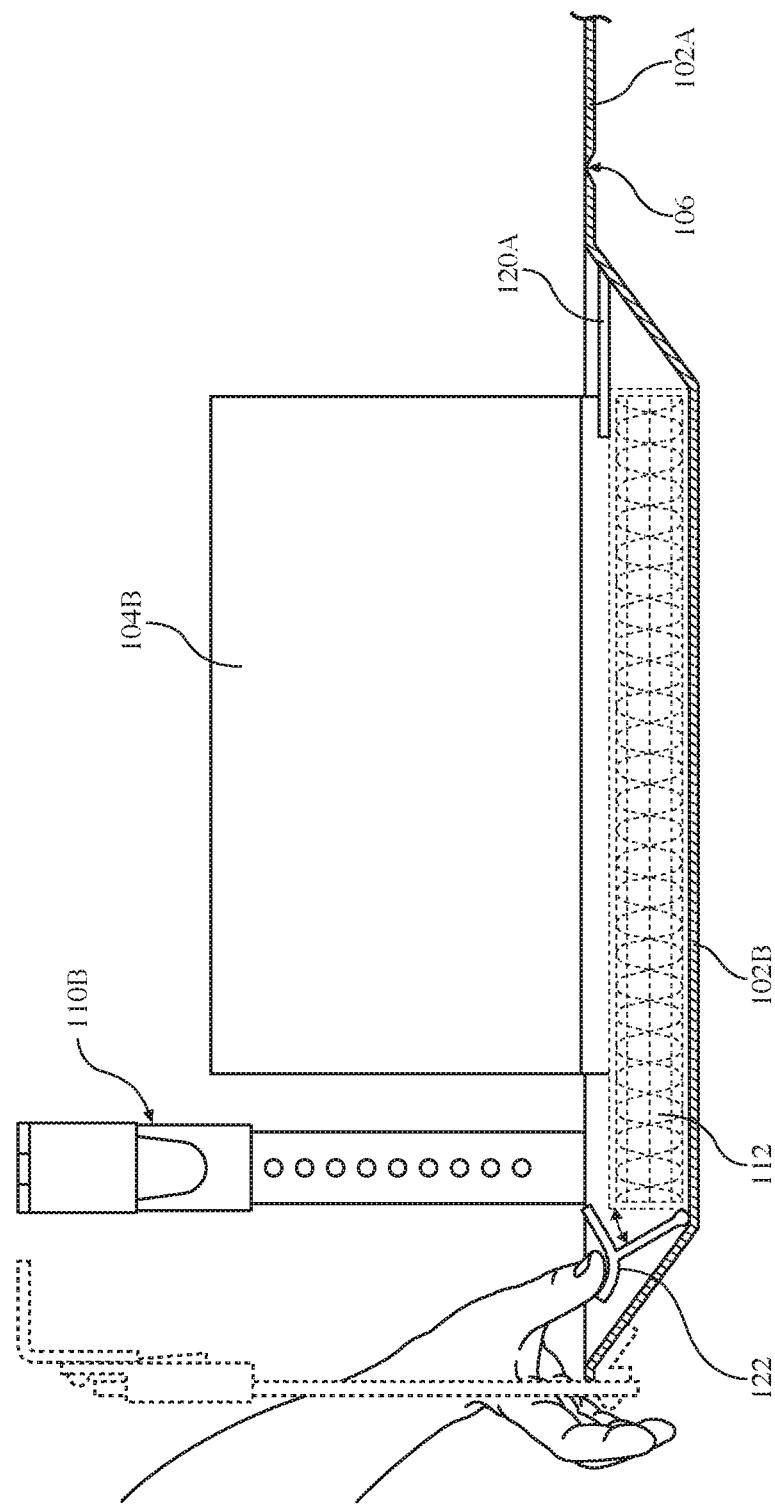

LEAK CATCHING DEVICE

BACKGROUND

In today's society, various types of vehicles, automobiles, tractors, off-road vehicles, recreational vehicles, heavy equipment, presses, and other types of devices, equipment, and/or machines can require various fluids including but not limited to lubricants, fuels, cooling, brakes, and hydraulic systems are among the various types of fluids that may be present. These vehicles, devices, equipment and/or machines use these and many other various fluids, which must be sealed with a gasket within controlled systems for their various uses. Each of the sealed or partially sealed systems are vulnerable to corrosion, time, elements, light, and corruption which eventually leads to a failure or partial failure of the sealing methods, or in other words leaks occur. An example is within an automobile, a crank seal, or oil pan gasket may fail and begin to leak fluids.

Unfortunately, there is no perfect seal or gasket which can function without fail for the life of the engine, automobile, device, equipment, and/or machinery. This imperfection in sealing results in leaks of various sizes and frequency. Often these leaks can be easily repaired, and in such situations, this is the recommended course of action, but when a leak is either too difficult to make such repairs, a leak if often left to continue to drip. This results in not only a trail or leak that defiles the ground or other equipment, but also harms the environment and exposes society to various hazardous materials and conditions common to leaks. For example, a person that has ever ridden a motorcycle can attest to the oily slick conditions that are often present in a center of a lane of travel on the roads and highways that are a direct result of the numerous leaks from vehicles. In addition, there is the embarrassing drippings that mar otherwise spot free surfaces in millions of driveways and garages around the world. Given the various chemical composition of the various fluids, it is critical to prevent the escape of the fluid into the environment.

SUMMARY

Various embodiments are provided for a leak catching apparatus. The leak catching apparatus may include a plate having a first section, a center section, and a second section, wherein the first section is non-coplanar with the second section; an absorbent material housed on the first section; one or more absorbent material attachments coupled to the first section to secure the absorbent material to the first section; and one or more plate attachments coupled to the first section and the second section, wherein the one or more plate attachments temporarily secures the first section and the second section to a sealed system that contains liquid.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 1B is a side view of a leak catching device according to one embodiment of the present invention of FIG. 1A.

DETAILED DESCRIPTION OF THE DRAWINGS

Figure 1A:
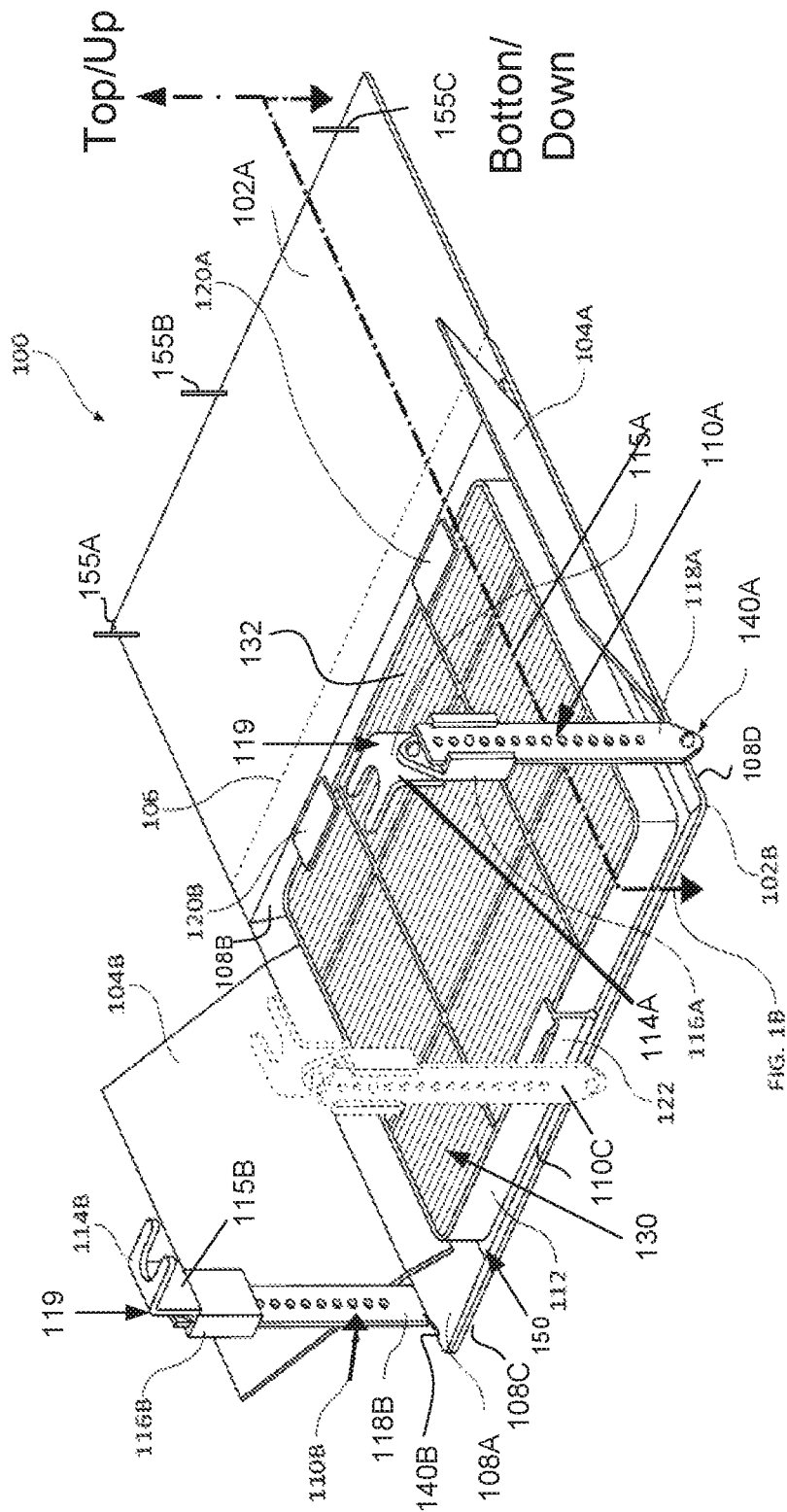
FIG. 1A is a perspective view a leak catching device with adjustable mounting devices and locking mechanisms to secure a liquid absorbent means according to one embodiment of the present invention.

The following detailed description of the invention merely provides exemplary embodiments and is not intended to limit the invention or the application and uses of the invention. Furthermore, there is no intention to be bound by any theory presented in the preceding background of the invention or the following detailed description of the invention.

Before the disclosed embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various technology embodiments. One skilled in the relevant art will recognize, however, that such detailed embodiments do not limit the overall inventive concepts articulated herein, but are merely representative thereof.

As used in this specification and the appended claims, the singular forms "a," "an" and "the" include plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one invention embodiment. Thus, appearances of the phrases "in an example" or the like in various places throughout this specification do not necessarily all refer to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of language, even though not expressly recited in a list of items following such terminology. When using an open ended term in this specification, like "comprising" or "including," it is understood that direct support should be afforded also to "consisting essentially of language as well as" consisting of language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "improved," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a process that provides "improved" efficiency is a process that requires less time or energy to perform the process than to perform the same or a similar state of the art process. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of particles would either completely lack particles, or so nearly completely lack particles that the effect would be the same as if it completely lacked particles. In other words, a composition that is" substantially free of an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Example Embodiments

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

In one aspect, the illustrated embodiments provide solutions to the aforementioned challenges of retaining various types of fluids contained within the a automobile, a tractor, a trailer, a semi-truck, a motorcycle, a heavy equipment, an all-terrain vehicle, a utility vehicle, a golf cart, a buggy, a scooter, other type of motorized vehicle, an engine, a motor, a transmission, a radiator, a differential, a hydraulic press, a hydraulic pump, a water pump, a device, and/or machinery containing or using fluids (hereinafter referred to as "Leaking Equipment"). In one aspect, the present invention provides for a leak-catching device that can prevent one or more types of leaks or drips spilling from Leaking Equipment from fouling surfaces and retaining the leaking fluids within an absorbent media housed within the leak-catching device.

In one aspect, the present invention provides for a leak catching apparatus, comprising: a plate having a first section, a center section, and a second section, wherein the first section is non-coplanar with the second section; an absorbent material housed on the first section; one or more absorbent material attachment means coupled to the first section to secure the absorbent material to the first section; and one or more plate attachment means coupled to the first section and the second section, wherein the one or more plate attachment means temporarily secures the first section and the second section to a sealed system that contains liquid. It should be noted that as used herein the term "plate" may also make reference to and/or be used to represent a panel, dish, bowl, saucer, cup, and/or other type of design configuration capable of holding, supporting, receiving, securing, and/or retaining an absorbent material and/or liquid.

In one aspect, the present technology provides a mounting apparatus. The mounting apparatus having a first plate having a first side panel, a second side panel, a first end panel, and a second end panel, wherein the first side panel, the second side panel, the first end panel, and the second end panel angularly extend from the first plate defining an open volume. The mounting apparatus having a second plate coupled to a first end panel, wherein the first plate is non-coplanar with the second plate. The mounting apparatus having absorbent material housed within the open volume on the first plate. The mounting apparatus having an arm extending from the first end panel, wherein the arm is parallel to the first plate. The mounting apparatus having a latching device adjacent to the second end panel and extending perpendicular from the first plate, wherein the absorbent material is retained under the arm and the latching device. The latching device having a plurality of methods and materials used to secure the absorbent material to the open volume of the first plate. The mounting apparatus having one or more first attachment means coupled to the first plate and one or more second attachment means couple to the second plate, wherein the one or more first attachment means and the one or more second attachment means temporarily secures the first plate and the second plate to a structure associated with the Leaking Equipment. The mounting apparatus having one or more splash-guards angularly coupled to the first side panel and the second side panel.

In one aspect, the present technology provides a leak prevention apparatus. The leak prevention apparatus can receive a liquid spilling, leaking, dripping, and/or escaping from Leaking Equipment and in the present example an internal combustion engine, transmission, radiator, a structure that houses a liquid, and/or a structures that is associated with the internal combustion engine, the transmission, the radiator, and/or the structure that houses a liquid, and/or a combination thereof.

The leak prevention apparatus can include a receiving means, such as a plate, pan, cup, bowl, saucer, having an open volume for receiving any liquid leaking from Leaking Equipment. A handle means can be coupled to the receiving means. An absorbent device, such as an absorbent pad or absorbent cartridge, can be housed within the open volume on the receiving means. One or more latching devices can be coupled to one or more positions of the receiving means. The absorbent material can be retained in the open volume by the one or more latching devices. One or more first attachment means can be coupled to the receiving means. The one or more first attachment means can temporarily secure the receiving means to the structure of or surrounding the Leaking Equipment. One or more second attachment means can be coupled to the handle. The one or more second attachment means can secure the plate to the Leaking Equipment. One or more splash guards can be angularly coupled to the receiving means.

In one aspect, the leak prevention apparatus embodiments described herein can also be armoring material. The embodiments described herein of the leak prevention apparatus may be of a variety of configurations that may include and/or may be rigid armor panels and/or plates constructed of a variety of materials including but not limited to metallic, ceramic, composite, fiberglass, nylon, aramid fiber and semi-crystalline polyolefin structures. The leak prevention apparatus armoring materials and components can be lightweight structures capable of defeating anticipated projectile threats. The leak prevention apparatus armor structures can transfer kinetic energy inherent in the moving projectile so as to prevent penetration of the projectile and armor material spall (projectile and armor fragments) through the armor. For example, at least one plate, at least one side panel, and/or at least one splashguard of the leak prevention apparatus can be armor plated and/or comprising armor materials and/or components.

In one aspect, the leak prevention apparatus embodiments described herein can the plate (e.g., armor plate) having the first section, the center section, and the second section each being comprised of armoring material capable of resisting projectile penetration. In one aspect, the plate may be an armor plate. The armor plate can include and innermost or an outermost side of the armor plate for absorbing and distributing kinetic energy. The armor plate comprising a pair of sheets of an ionomer and a rigid thermoplastic structure between said sheets.

Turning to the FIGS. 1A and 1B, a leak catching device 100 is depicted according to one embodiment of the present invention. The leak catching device 100 can have a first plate 102B and a second plate 102A. In one aspect, the first plate 102B and the second plate 102A can be on singular plate and/or can be comprised of two or more separate plates.

In one aspect, the first plate 102B can include a first side panel 108A, a second side panel 108D, a first end panel 108B, and a second end panel 108C. In one aspect, the first side panel 108A, the second side panel 108D, the first end panel 108B, and the second end panel 108C can be one continuous singular piece and/or four separate pieces collectively attached to each other and the first plate 102B. Alternatively, the first plate 102B can be bent at one or more locations with the outer perimeter edges being angularly bent upwards to form the first side panel 108A, the second side panel 108D, the first end panel 108B, and the second end panel 108C. Thus, in one aspect the first plate 102B and the first side panel 108A, the second side panel 108D, the first end panel 108B, and the second end panel 108C can be one singular plate that is configured in one or more geometrical shapes or sizes. For example, collectively, the first plate 102B with the first side panel 108A, the second side panel 108D, the first end panel 108B, and the second end panel 108C can be have a shape of a bowl, dish, saucer, oval, or other shape and size. Alternatively, the first plate 102B with the first side panel 108A, the second side panel 108D, the first end panel 108B, and the second end panel 108C can have a square or rectangular shape with a depression therein forming an open volume for housing one or more absorbent materials or devices.

The first side panel 108A, the second side panel 108D, the first end panel 108B, and the second end panel 108C can angularly extend from the first plate 102B defining an open volume 150. In one aspect, the second plate 102A can be coupled to a first end panel 108B. The first plate 102B can be non-coplanar with the second plate 101A. The leak catching device 100 can include at least one absorbent material 130 housed within the open volume 150 on the first plate 102B. In one aspect, the first plate 102B can include at least 2 absorbent materials 130 adjacently housed within the open volume 150. It should be noted that FIG. 1A-1B depicts, by way of example only, a single one absorbent material 130. However, the first plate 102B can include one or more of the absorbent material 130.

The leak catching device 100 can include at least one or more securing arm, such as, for example, securing arms 120A, 120B (which can be individually and/or collectively referred to herein as 120) extending from the first end panel 108B of the first plate 102B. The one or more securing arms 120A or 120B can be parallel to the first plate 102B and/or parallel to the second plate 102A. The leak catching device 100 can include a latching device 122 coupled to the first plate 102 and adjacent to the second end panel 108C and extending perpendicular from the first plate 102B. The absorbent material 130 can be temporarily and/or permanently retained under the one or more securing arm 120A or 120B and/or under the latching device 122.

In one aspect, as depicted in FIG. 1B, the latching device 122 can be a spring type device that can pivotally connect to the first plate 102B. The latching device 122 can have a "t-shape" with a top portion capable of being manipulated in one of a variety of directions, such as being manipulated towards and/or away from the absorbent materials. For example, the latching device 122 can be manipulated away from the absorbent material for allowing quick release and removal of the absorbent material 130 from the first plate 102B. For example, a new, different, and/or same absorbent material 130 on a first side can be placed into the open volume 150 on the first plate 102B and secured under the one or more securing arms 120A, 120B. The latching device 122 can then be manipulated back towards the absorbent material 130 and remain in a fixed position to secure a second or opposite side (as compared to the first side) of the absorbent material 130 in the open volume 150 of the first plate 102B.

The leak catching device 100 can include at least one or more first attachment means, such as first attachment means 110A, 110B, or 110C (which can be individually and/or collectively referred to herein as 110) that can be coupled to the first plate 102B and one or more second attachment means, such as second attachment means 155A, 155B, 155C (which can be individually and/or collectively referred to herein as 155) that can be coupled to the second plate 102A. The one or more first attachment means 110 and/or the one or more second attachment means 155A, 155B, or 155C can temporarily and/or permanently secure the first plate 102B and the second plate 102A to a structure and/or frame associated with the Leaking Equipment.

In one aspect, the leak catching device 100 can include one or more splashguards, such as splashguards 104A, 104B (which can be individually and/or collectively referred to herein as 104). The one or more splashguards can be coupled to the first plate 102B. In one aspect, the one or more splashguards 104 can be coupled, such as angularly coupled, to the first side panel 108A and the second side panel 108D.

In one aspect, the first plate 102B and the second plate 102A can be one of a plurality of geometric shapes and sizes of height, width, depths, and/or weight. For example, the first plate 102B and/or the second plate 102A can have a rectangular, square, oval, round, oblong, and/or circular shape. In one aspect, the first plate 102B and the second plate 102A can have a different geometric shape and size. For example, in one aspect, the second plate 102A can have a square or rectangular shape of a selected size and the first plate 102B can have a circular bowl or saucer shape and a different selected size. Alternatively, the first plate g shape and/or size. Thus, according to need and designer or user preference, the first plate 102B and the second plate 102A can have one or more identical and/or different geometric shapes and/or different size of height, width, and/or depths.

In one aspect, the absorbent material 130 can be an absorbent cartridge. In one aspect, the absorbent material 130 can be, for example, arranged, in a support frame 112. The absorbent material 130 can include one or more pleated materials 132 arranged in a serpentine configuration or an accordion geometric shape with a plurality of parallel runs within a support frame to create an "absorbent cartridge". In an additional embodiment, the absorbent material 130 can be one or more types of materials arranged in one of a variety of shapes, sizes, and/or geometric configurations. The absorbent material 130 can be arranged in the support frame 112, wherein the absorbent material 130 includes one or more pleats arranged in a serpentine configuration with a plurality of parallel runs in an accordion geometric shape.

In one aspect, the leak catching device 100 can include at least a hinge 106 coupled to the first end panel 108B and/or to the second plate 102A. The first plate 102B can rotationally pivot via the at least one hinge 106. In an additional aspect, the second plate 102A can includes a knuckled and/or a notched hinge 106. The first plate 102B configured to rotationally bend at the notched hinge 106. In an additional aspect, the hinge 106 may include a removable rod, clip, notch, pin, latch or other pivot point allowing the hinge to come apart and disconnect or separate the first plate 102B from the second plate 102A. In an additional embodiment, the first plate 102B and the second plate 102A can be a singular piece of material that may and/or may not include the hinge 106. For example, a portion of either the first plate 102B or the second plate 102A may be bent to create a "step down" (or step or sloped shape) configuration such that the first plate 102B is non-coplanar with the second plate 102A. Notches may be in the bent or shaped portion to create a natural hinge allowing the first plate 102B and the second plate 102A to be rotated or bent away or towards each other.

In an additional aspect, the one or more first attachment 110 means can have a body, such as body 118A, 118B (which can be individually and/or collectively referred to herein as 118), a first mounting end, such as first mounting ends 116A, 116B (which can be individually and/or collectively referred to herein as 116), and one or more second mounting ends, such as second mounting ends 140A, 140B, as illustrated in FIG. 1.

The one or more first mounting ends 116A, 116B and the one or more second mounting ends 140A or 140B can be adjustably positioned to one or more positions on the body of 118A and/or 118B. For example, each type of Leaking Equipment and/or structure housing the Leaking Equipment can have different shapes and/or sizes. Thus, the one or more first mounting end 116A, 116B and/or the one or more second mounting ends 140A or 140B can be adjustably positioned upwards and/or downwards to one or more positions on the body of 118A and/or 118B. Thus, the leak catching device 100 can be positioned level to the ground on the structure and/or the Leaking Equipment itself in order to receive a leaking liquid, such as oil, water, and/or transmission fluid, by the absorbent material or absorbent cartridge. In one aspect, the one or more first attachment 110 can be adjusted according to user and/or designer preferences. In one aspect, at least one of the first mounting ends 116A, 116B can be pivotally connected to at least one of the first end panel 108C, the first side panel 108A, the second side panel 108C, and/or a combination thereof. The one or more second mounting ends 140A, 140B can be pivotally connected to Le aking Equipment or associated structures.

The body 118 can have a first end and a second end, such as a top end towards the top and/or a bottom end towards the bottom, as oriented as depicted in FIG. 1A depicting the top/up and/or bottom/down directions. At least one or more of the first mounting ends 116A, 116B can be the first end/top end and can adjustably positioned the first end of the body 118, and the one or more second mounting ends 140A, 140B can be adjustably positioned to the second end of the body 118.

In one aspect, the one or more first mounting ends 116A, 116B (e.g., at the top end of the body 118) can have an elbow 119 having a first elbow panel side, such as first elbow panel sides 114A, 114B, and a second elbow panel side, such as second elbow panel sides 115A, 115B. The second elbow panel sides 115A, 115B each can be adjustably positioned on the first end of the body, such as the first end of the bodies 110A, 110B, and the first elbow panel sides 114A, 114B can each be a slotted panel (e.g., such as having a "fork" shape) that can attach to the elbow 119 to and/or receive a securing means on the structure associated with the Leaking Equipment.

In one aspect, the one or more second attachment means 155 can each be a rivet, a screw, a pin, a bolt, a fastener, a clip, a nail, a spring, a bracket, a nut, a slot, a rod, a clamp, a glue, an adhesive, the one or more first attachment means 110, and/or a combination thereof.

In one aspect, the leak catching device 100, including one or more components as described herein, such as, for example, the first plate 102B, the second plate 102A, the attachment devices 110, the latching device 122, the splash guards 104, and/or the frame of the absorbent cartridge 130 can be composed of a steel, an iron, a sheet metal, a die-cast aluminum, a sheet aluminum, a cast aluminum, a high-strength lightweight alloy material, any metallic material, a fiberglass material, a non-flammable material, a plastic material, a rubber material, a dense foam material, a fibrous material, a polyvinyl chloride (PVC) material, a carbon fiber, a polyurethane material, a stretchable material, a moldable material, a joint metallic and polyurethane material, a polyamide-based thermoplastic material reinforced with glass fibers and/or mineral matter, a magnetic material, a glass material, a ceramic material, and/or any other material or combination of materials known in the art, which are suitable for such an application.

The absorbent material 130 may be composed of a dense foam, a plastic, a carbon fiber, a polyurethane material, a fibrous material, a rubber material, a cotton fiber, a wood fiber, a cloth material, a gel or gel beads, a rock, a sand, a powder, or any other natural or man-made material or combination of materials known in the art, which are suitable for such an application.

In one aspect, the leak catching device can be fabricated by a one-component or multicomponent injection-molding or vacuum molding process. For example, the leak catching device can be fabricated by a one-component and/or multi-component injection-molding or vacuum molding process in which polyamide-based thermoplastic materials are used.

Figure 2:
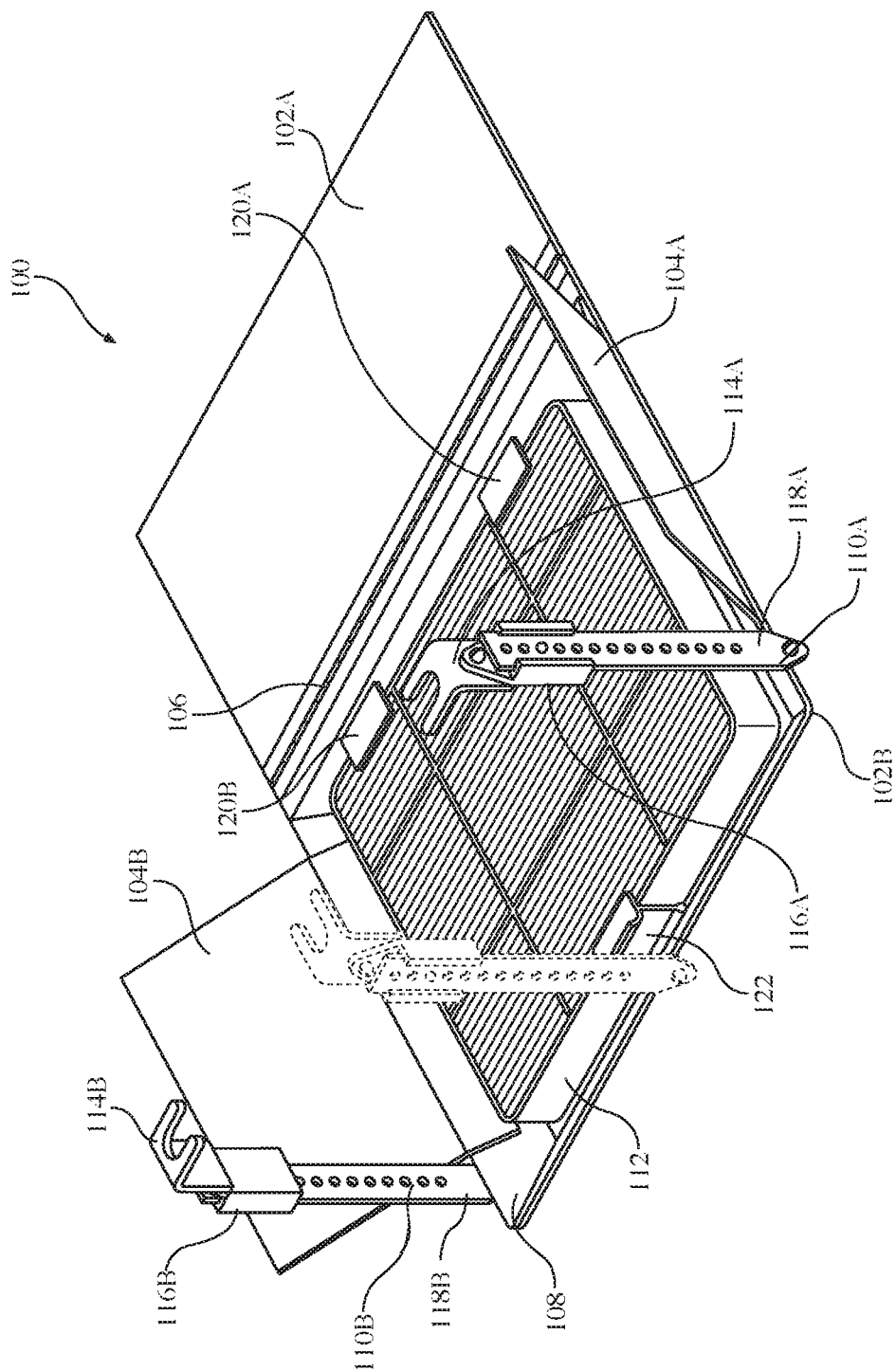
FIG. 2 is a perspective view a leak catching device with a liquid absorbent means according to one embodiment of the present invention of FIG. 1A.

FIG. 2 is a perspective view a leak catching device 100 with a liquid absorbent means according to one embodiment of the present invention. As depicted in FIG. 2, the hinge 106 can be a movable joint or mechanism on which the first plate 102B can rotationally pivot or swing as it opens (e.g., the first plate 102B releases from a fixed position and rotationally pivots in a downward direction away from the second plate 102A) and/or closes (e.g., the first plate 108 returns to a fixed position by rotationally pivoting in an upward direction toward the second plate 102A), and/or connects the first plate 102B and the second plate 102A.

For example, the hinge 106 can be a spring hinge and the spring hinge can have a spring that can be disposed on a shaft within a housing encircling the periphery of the spring so as to enclose the spring coils. The hinge 106 can provide constant torque or resistance to movement throughout its range of motion for rotating the first plate 102B (here it can be assumed that second plate 102A is in a fixed position, such as being secured to Leaking Equipment or the associated structure itself). In an effort to provide more constant torque a spring back can be used in the operation of the spring hinge 106 to allow the spring hinge 106 to rotate back after applied force is removed.

For another example, the hinge 106 can be comprised of a rod or pin with a barrel shaped hole in both 102A and 102B are laid side by side and into which a pin, rod, clip, or other hinge type pivoting device may be inserted and either permanently affixed or made to be removable to allow complete separation of 102A and 102B, as well as pivoting on the axis of 106, when not fastened securely by 110 attachment devices 110.

One or more second attachment means 155 can be coupled to the second plate 102A to connect to a different location of the structures that can be associated with the Leaking Equipment. For example, in one aspect, the one or more second attachment means 155 can secure or fasten the second plate 102A "flush" up against and/or adjacent to the structure that houses a liquid, and/or a structures that is associated with the Leaking Equipment. The one or more second attachment means in 155 may be placed anywhere on 102A. 102A may be cut, trimmed, or modified to go around or avoid obstructions or nonplanar surfaces.

Figure 3:
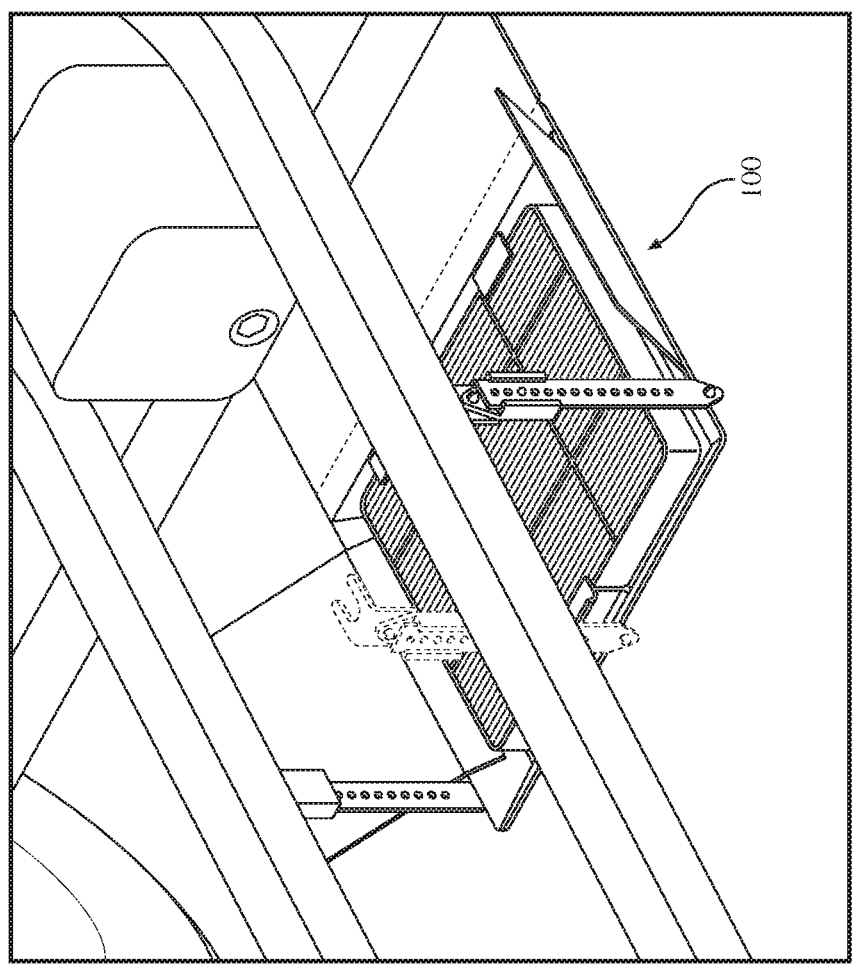
FIG. 3 is perspective view of a leak catching device according to one embodiment of the present invention of FIG. 1A mounted to a vehicle according to one embodiment of the present invention.

One or more splash guards 104 can be angularly coupled to the receiving means thereby prohibiting the oil absorbent material from external debris, wind, water, or other types of liquid from entering into the leak catching device 100. Alternatively, the one or more splash guards 104 prevent the absorbed liquid in the absorbent material from spilling, splashing, and/or leaking from the leak catching device 100 into the surrounding environment. The one or more splash guards may be cut, trimmed, modified, or completely removed to go around or avoid obstructive surfaces. FIG. 3 is perspective view a leak catching device 100 according to one embodiment of the present invention of FIG. 1A-1B mounted to a vehicle according to one embodiment of the present invention. In one aspect, the one or more first attachment means 110 of the leak prevention apparatus 100 can temporarily secure the first plate 102B to the Leaking Equipment. In one aspect, the first plate 102B and the second plate 102A can be substantially horizontal and/or in a parallel position relative to a floor or road surfaces (not shown) allowing gravity to aid depositing fluids on the leak catching device.

Figure 4:
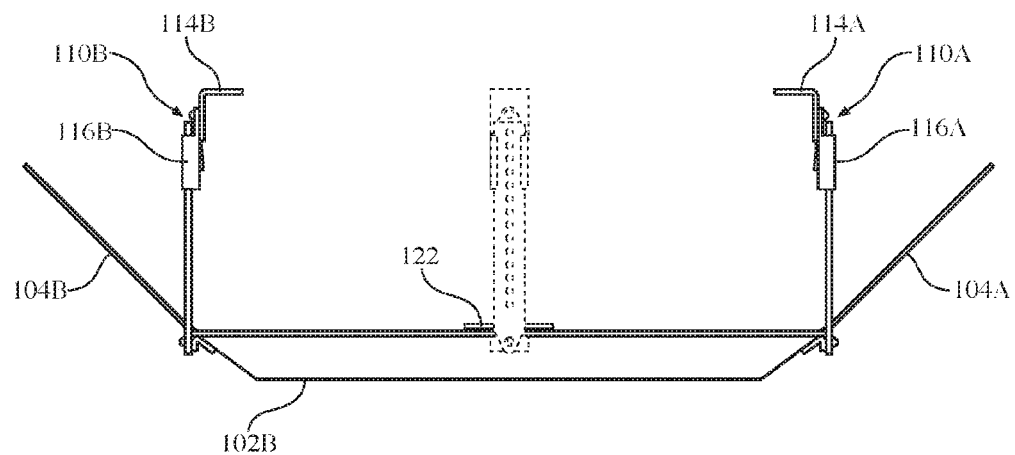
FIG. 4 is a rear view illustration of the leak catching device of FIG. 1A, according to one embodiment of the present invention.
Figure 5:
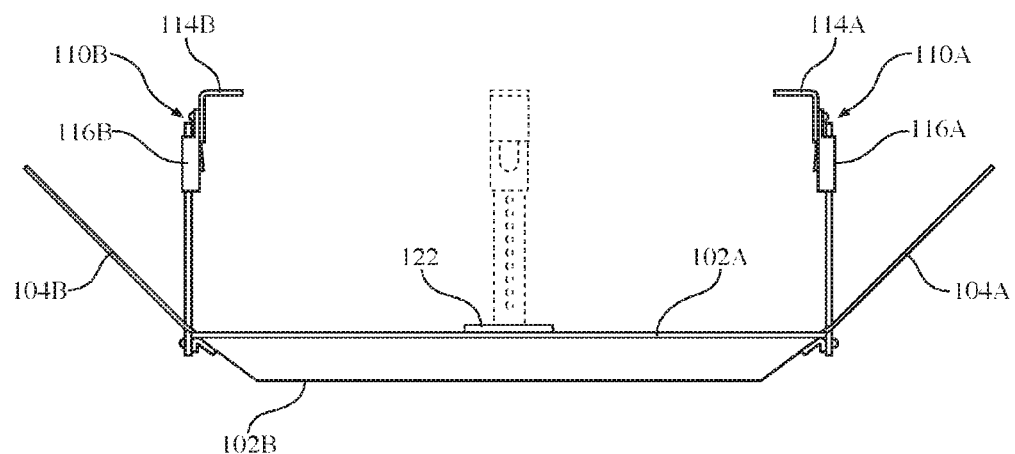
FIG. 5 is a front view illustration of the leak catching device of FIG. 1A, according to one embodiment of the present invention.
Figure 6:
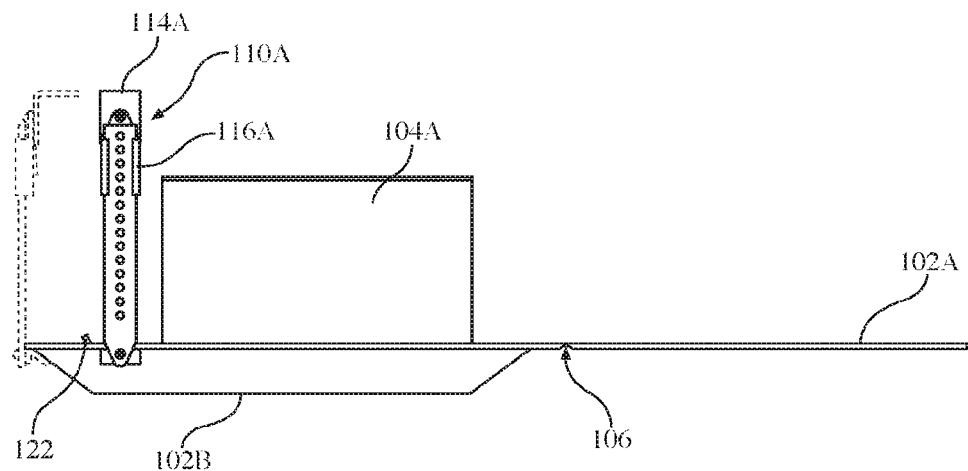
FIG. 6 is a first side view illustration of the leak catching device of FIG. 1A, according to one embodiment of the present invention.
Figure 7:
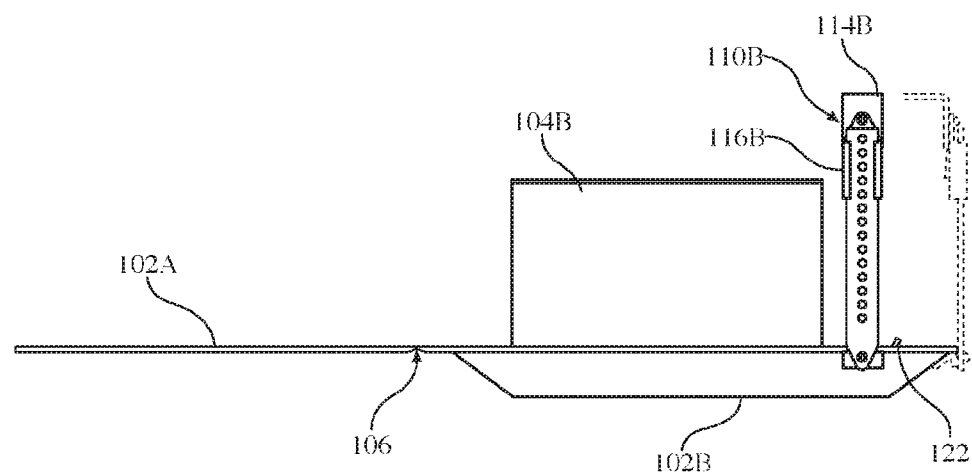
FIG. 7 is a second side view illustration of the leak catching device of FIG. 1A, according to one embodiment of the present invention.

FIG. 4 is a rear view illustration of the leak catching device of FIG. 1A, according to one embodiment of the present invention. FIG. 5 is a front view illustration of the leak catching device of FIG. 1A, according to one embodiment of the present invention. FIG. 6 is a first side view illustration of the leak catching device of FIG. 1A, according to one embodiment of the present invention. FIG. 7 is a second side view illustration of the leak catching device of FIG. 1A, according to one embodiment of the present invention. As depicted in FIGS. 4-7, the first plate 102B and/or the second plate 102A can be a thickness of a variety of sizes (e.g. greater than or equal to at least 0.01 millimeter) can be defined according to user preference. design and/or aesthetic preference, and/or safety requirements. In one aspect, the first plate 102B and the second plate 102A can be one singular continuous material having a hinge 106 notching the one singular continuous material to define a separation between the first plate 102B and the second plate 102A, creating an inherent weakness along the line of the thinner material, which creates a bending or hinge point, as more clearly depicted in FIG. 7. Alternatively, the first plate 102B and the second plate 102A can each be a separate piece of material coupled together at the hinge 106.

In one aspect, the one or more splash guards can be positioned along one or more various selected locations on the first plate 102B. In one aspect, as more clearly depicted in FIGS. 6-7, the one or more first attachment means 110 of the leak prevention apparatus 100 can be positioned and secured to the first plate 102B at a first end, such as near the second end panel 108C depicted in FIG. 1A, which can be closest to the latching device 122. In an additional aspect, the one or more first attachment means 110 can be positioned at one or more measurable or selected positions on the first plate 102B such as at 108A, 108C or 108D, or any combination thereof, or removed entirely.

In an additional aspect, as depicted in FIGS. 4-7, the first plate 102B can include at least three first attachment means 110, such as the one or more first attachment means 110A, 110B and the one or more first attachment means 110 depicted in FIGS. 4-7 having "dashed lines" or a silhouette image. In other words, the more first attachment means 110 can be on located on the first plate 102B on the first side panel 108A, the second side panel 108D, the first end panel 108B, and/or the second end panel 108C, or any combination thereof.

Figure 8:
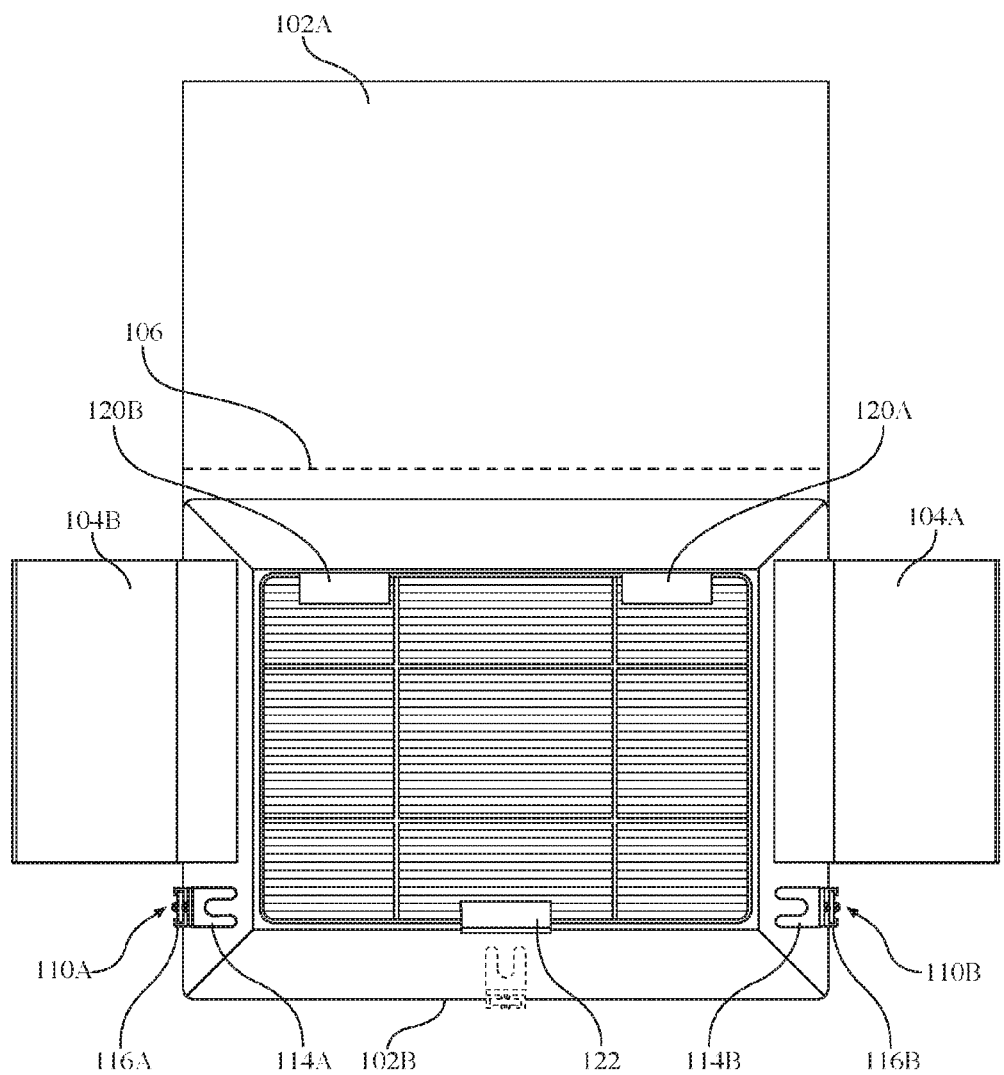
FIG. 8 is a first top view illustration of the leak catching device of FIG. 1A having the absorbent material, according to one embodiment of the present invention.

FIG. 8 is a first top view illustration of the leak catching device 100 of FIG. 1A having the absorbent material, according to one embodiment of the present invention. As depicted in FIG. 8, the leak catching device 100 illustrates the absorbent material 130 housed within a defined open volume 150 (see FIG. 1A-1B) of the first plate 102B. The absorbent material 130 is depicted being secured under the latching device and/or the securing arms 120A, 120B. The one or more splash guards are depicted as being connected to the first plate 102B. More specifically, the one or more splashguards 104A, 104B are coupled to the first side panel 108A second side panel 108D (see FIG. 1A-1B) on an inner side within the open volume 150. That is, the one or more splash guards 104A, 104B are angularly coupled to the first side panel 108A second side panel 108D with a bottom portion of the one or more splash guards 104A, 104B extending downward along the first side panel 108A second side panel 108D to a bottom portion of the first plate 102B. In this way, a bottom portion of the one or more splashguards 104A, 104B can also be used to secure the absorbent material within the open volume 150 to prevent movement, such as side or lateral movement. It should be noted that the securing arms 120A, 120B are depicted, by way of example only, as being coupled to one side of the first plate 102B, such as the first end panel 108B. However, one or more securing arms 120A, 120B can be coupled to one or more sides (e.g., four sides) of the first plate 102B, such as being coupled to the first side panel 108A, the second side panel 108D, the first end panel 108B, and/or the second end panel 108C. In this way, the one or more splashguards can provide secondary support to secure the absorbent material 130 on the first plate 102B.

Figure 9:
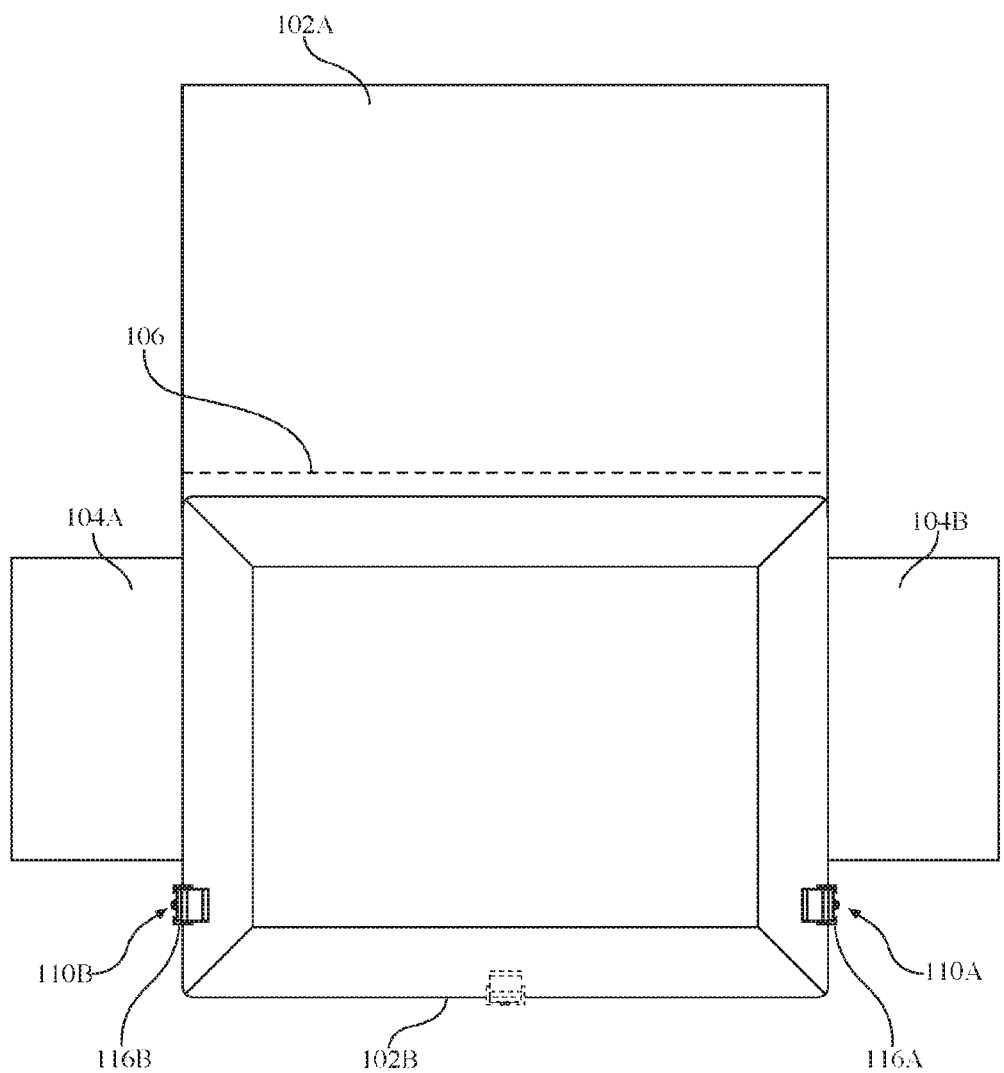
FIG. 9 is a top view illustration of the leak catching device of FIG. 1A without the absorbent material, according to one embodiment of the present invention.

FIG. 9 is a first bottom view illustration of the leak catching device of FIG. 1A according to one embodiment of the present invention. The first plate 102 can be depicted as having each side angularly extending upwards (more clearly defined in FIG. 1A as the first side panel 108A, the second side panel 108D, the first end panel 108B, and/or the second end panel 108C). In an alternative embodiment, as compared to FIG. 8, the one or more splashguards can be connected to inner and outer surface of the first plate 102B. More specifically, the one or more splashguards 104A, 104B are coupled to the first side panel 108A, the second side panel 108D, or the end panel 108C (see FIG. 1A-1B) by connecting 108A, 108C, or 108D into a slotted groove in 104A, 104B, such that 104A or 104B cover both the inside surface and outside surface of 108A, 108C, or 108D, compressing and holding them firmly in place.

In one aspect, the first plate 102B can include a center section defined within each of the sides angularly extending upwards that can be fully removed, unattached, and/or released from the leak catching device from one of a plurality of means of attachment at one or more locations on the center section. For example, all and/or only a defined portion of the center section can support the entire area of the absorbent material. Thus, when the center section of the first plate 102B is removed, unattached, and/or released from the sides, the absorbent material can easily be removed and/or replaced with a new absorbent material. For example, the one or more second attachment means may include a rivet, a screw, a pin, a bolt, a fastener, a clip, a nail, a spring, a bracket, a nut, a slot, a rod, a clamp, an adhesive, a magnet, a combination thereof, and/or any other material or combination of materials known in the art, which are suitable for such an application.

In one aspect, the present technology provides for a leak catching apparatus, comprising: a plate having a first section, a center section, and a second section, wherein the first section is non-coplanar with the second section. The leak catching apparatus can include an absorbent material housed on the first section; one or more absorbent material attachment means coupled to the first section to secure the absorbent material to the first section; and/or one or more plate attachment means coupled to the first section and the second section, wherein the one or more plate attachment means temporarily secures the first section and the second section to a sealed system that contains liquid.

In one aspect, the center section can be upwardly angled from the first section to the second section. The first section can include one or more side panels angularly extending from the first section.

In one aspect, the leak catching apparatus can include one or more splashguards angularly coupled to the one or more side panels. The first section and the second section can be one of a plurality of geometric shapes and sizes. The absorbent material can be arranged in a support frame, wherein the absorbent material includes one or more pleats arranged in a serpentine configuration with a plurality of parallel runs, such as an accordion. The center section can define a pivot axis, wherein the first section configured to pivotally rotate around the pivot axis.

In one aspect, the present technology provides for an apparatus, comprising: a first plate having a first side panel, a second side panel, a first end panel, and a second end panel, wherein the first side panel, the second side panel, the first end panel, and the second end panel angularly extend from the first plate defining an open volume; a second plate coupled to a first end panel, wherein the first plate is non-coplanar with the second plate; an absorbent material housed within the open volume on the first plate; at least one securing arm extending from the first end panel, wherein the at least one securing arm is parallel to the first plate; a latching device coupled to the first plate and adjacent to the second end panel and extending perpendicular from the first plate, wherein the absorbent material is retained under the least one securing arm and the latching device; one or more first attachment means coupled to the first plate and one or more second attachment means couple to the second plate, wherein the one or more first attachment means and the one or more second attachment means temporarily secures the first plate and the second plate to a structure associated with the internal combustion engine; and/or one or more splash guards angularly coupled to the first side panel and the second side panel.

In one aspect, the first plate and the second plate 102A are one of a plurality of geometric shapes and sizes. The absorbent material is arranged in a support frame, wherein the absorbent material includes one or more pleats arranged in a serpentine configuration with a plurality of parallel runs.

In one aspect, the leak catching device can include a hinge coupled to the first end panel to the second plate, wherein the first plate rotationally pivots via the hinge. The second plate can include a notched hinge, wherein the first plate configured to rotationally bend at the notched hinge.

In one aspect, the one or more first attachment means can include a body a first mounting end and a second mounting end, wherein the first mounting end and the second mounting end are configured to be adjustably positioned to one or more positions on the body, wherein the first mounting end is pivotally connected to one of the first end panel, the first side panel, the second side panel, or a combination thereof, wherein the second mounting end is pivotally connected to the structure associated with the internal combustion engine. The body can include a first end and a second end; wherein the first mounting end is adjustably positioned the first end of the body and the second mounting end is adjustably positioned to the second end of the body.

In one aspect, the first mounting end can include an elbow attachment device having a first elbow panel side and a second elbow panel side, wherein the second elbow panel side is adjustably positioned the first end of the body, and the first elbow panel side is a slotted panel that receives and attaches the elbow to a securing means on the structure associated with the internal combustion engine.

The one or more second attachment means is a rivet, a screw, a pin, a bolt, a fastener, a clip, a nail, a spring, a bracket, a nut, a slot, a rod, a clamp, an adhesive, the one or more first attachment means, or a combination thereof.

In one aspect, the present technology provides for a leak prevention apparatus, comprising: a pan having defining an open volume for receiving a liquid leaking from an internal combustion engine; a plate coupled to the pan; an absorbent material housed within the open volume on the pan; one or more latching devices coupled to one or more positions of the pan, wherein the absorbent material is retained in the open volume by the latching device; one or more first attachment means coupled to the pan and one, wherein the one or more first attachment means temporarily secures the pan to a structure associated with the internal combustion engine; one or more second attachment means coupled to the plate, wherein the one or more second attachment means secures the plate to a structure associated with the internal combustion engine or the internal combustion engine itself; and/one or more splash guards angularly coupled to the pan.

In one aspect, the leak prevention apparatus can include a hinge device, the hinge devices connecting the pan to the plate, wherein the pan rotationally pivots downwardly or upwardly via the hinge device. The first plate and the second plate are one of a plurality of geometric shapes and sizes.

In one aspect, the absorbent material can be arranged in a support frame, wherein the absorbent material includes one or more pleats arranged in a serpentine configuration with a plurality of parallel runs, the absorbent material is removable from the pan.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A leak catching apparatus, comprising:
   a plate having a first section, a center section, and a second section, wherein the center section is upwardly angled from the first section to the second section such that the first section is non-coplanar with the second section, wherein the first section and the second section are symmetrical about the center section, and the center section defines a pivot axis, wherein the first section is configured to pivotally rotate around the pivot axis;
   an absorbent material housed on the first section;
   one or more absorbent material attachment means coupled to the first section to secure the absorbent material to the first section; and one or more plate attachment means coupled to the first section and the second section, wherein the one or more plate attachment means are configured to temporarily secure the first section and the second section to a sealed system that contains liquid.

2. The apparatus of claim 1, wherein the one or more absorbent material attachment means is a latching device configured to be manipulated away from the absorbent material allowing quick release and removal of the absorbent material.

3. The apparatus of claim 1, wherein the first section includes one or more side panels angularly extending from the first section.

4. The apparatus of claim 2, further including one or more splash guards angularly coupled to the one or more side panels.

5. The apparatus of claim 1, wherein the first section and the second section are one of a plurality of geometric shapes and sizes, wherein the geometric shapes include at least rectangular, square, oval, round, oblong, and/or circular shape, and the sizes may be a defined size according to user preference.

6. The apparatus of claim 1, wherein the absorbent material is arranged in a support frame, wherein the absorbent material includes one or more pleats arranged in a serpentine configuration with a plurality of parallel runs.

7. The apparatus of claim 1, wherein the one or more absorbent material attachment means is a latching device having a "T" shape.

8. The apparatus of claim 1, wherein the plate is an armor plate that comprises armor material or armor components.

9. An apparatus, comprising:
a first plate having a first side panel, a second side panel, a first end panel, and a second end panel, wherein the first side panel, the second side panel, the first end panel, and the second end panel angularly extend from the first plate defining an open volume;
a second plate coupled to the first end panel, wherein the first plate is non-coplanar with the second plate and the first plate and the second plate are symmetrical about the first end panel, the first end panel defines a pivot axis, wherein the first plate rotationally pivots via the pivot axis;
an absorbent material housed within the open volume on the first plate;
at least one securing arm extending from the first end panel, wherein the at least one securing arm is parallel to the first plate;
a latching device coupled to the first plate and adjacent to the second end panel and extending perpendicular from the first plate, wherein the absorbent material is retained under the least one securing arm and the latching device, wherein the latching device is configured to be manipulated away from the absorbent material allowing quick release and removal of the absorbent material;
one or more first attachment means coupled to the first plate and one or more second attachment means couple to the second plate, wherein the one or more first attachment means and the one or more second attachment means are configured to temporarily secure the first plate and the second plate to a structure associated with leaking equipment; and
one or more splash guards angularly coupled to the first side panel, the second side panel, the second end panel, or a combination thereof.

10. The apparatus of claim 9, wherein the first plate and the second plate are one of a plurality of geometric shapes and sizes, wherein the geometric shapes include at least rectangular, square, oval, round, oblong, and/or circular shape, and the sizes may be a defined size according to user preference.

11. The apparatus of claim 9, wherein the absorbent material is arranged in a support frame, wherein the absorbent material includes one or more pleats arranged in a serpentine configuration with a plurality of parallel runs in an accordion geometric shape.

12. The apparatus of claim 9, further including a hinge coupled to the first end panel to the second plate, wherein the hinge defines the pivot axis and the first plate rotationally pivots via the hinge.

13. The apparatus of claim 9, wherein the second plate includes a notched hinge, wherein the first plate configured to rotationally bend at the notched hinge.

14. The apparatus of claim 9, wherein the one or more first attachment means having a body a first mounting end and a second mounting end, wherein the first mounting end and the second mounting end are configured to be adjustably positioned to one or more positions on the body, wherein the first mounting end is pivotally connected to one of the first end panel, the first side panel, the second side panel, or a combination thereof, wherein the second mounting end is configured to be pivotally connected to the structure associated with an internal combustion engine.

15. The apparatus of claim 14, wherein the body has a first end and a second end; wherein the first mounting end is adjustably positioned the first end of the body and the second mounting end is adjustably positioned to the second end of the body.

16. The apparatus of claim 15, wherein the first mounting end has an elbow having a first elbow panel side and a second elbow panel side, wherein the second elbow panel side is adjustably positioned the first end of the body, and the first elbow panel side is a slotted panel that is configured to receive and attach the elbow to a securing means on the structure associated with leaking equipment.

17. The apparatus of claim 9, wherein the one or more second attachment means is a rivet, a screw, a pin, a bolt, a fastener, a clip, a nail, a spring, a bracket, a nut, a slot, a rod, a clamp, an adhesive, the one or more first attachment means, or a combination thereof.

18. A leak prevention apparatus, comprising:
a flexible pan defining an open volume for receiving a liquid leaking from a leaking apparatus;
a plate coupled to the pan, wherein the flexible pan and the plate are non-coplanar and symmetrical about a pivot axis, wherein the flexible pan is configured to pivotally rotate around the pivot axis;
an absorbent material housed within the open volume on the pan;
one or more latching devices coupled to one or more positions of the pan, wherein the absorbent material is retained in the open volume by the latching device;
one or more first attachment means coupled to the pan and one, wherein the one or more first attachment means are configured to temporarily secure the pan to a structure associated with the leaking apparatus;
one or more second attachment means coupled to the plate, wherein the one or more second attachment means is configured to secure the plate to a structure associated with the leaking apparatus or the leaking apparatus; and
one or more splash guards angularly coupled to the pan.

19. The apparatus of claim 18, further including a hinge device forming the pivot axis, the hinge devices connecting the flexible pan to the plate, wherein the pan rotationally pivots downwardly or upwardly via the hinge device.

20. The apparatus of claim 18, wherein the first plate and the second plate are one of a plurality of geometric shapes and sizes, materials, or a combination thereof, and wherein the absorbent material is arranged in a support frame, wherein the absorbent material includes one or more pleats arranged in a serpentine configuration with a plurality of parallel runs, the absorbent material is removable from the pan, wherein the geometric shapes include at least rectangular, square, oval, round, oblong, and/or circular shape, and the sizes may be a defined size according to user preference.

\* \* \* \* \*